United States Patent
Ohara

(10) Patent No.: US 12,137,482 B2
(45) Date of Patent: Nov. 5, 2024

(54) USER EQUIPMENT AND COMMUNICATION METHOD

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 269 days.

(21) Appl. No.: 17/754,123

(22) PCT Filed: Sep. 30, 2019

(86) PCT No.: PCT/JP2019/038656
§ 371 (c)(1),
(2) Date: Mar. 24, 2022

(87) PCT Pub. No.: WO2021/064843
PCT Pub. Date: Apr. 8, 2021

(65) Prior Publication Data
US 2022/0295573 A1    Sep. 15, 2022

(51) Int. Cl.
*H04W 74/0833* (2024.01)
*H04W 72/1268* (2023.01)
*H04W 74/08* (2024.01)

(52) U.S. Cl.
CPC ... *H04W 74/0841* (2013.01); *H04W 72/1268* (2013.01); *H04W 74/0866* (2013.01)

(58) Field of Classification Search
None
See application file for complete search history.

(56) References Cited

U.S. PATENT DOCUMENTS

| | | | |
|---|---|---|---|
| 2020/0100297 A1* | 3/2020 | Agiwal | H04W 52/365 |
| 2021/0022057 A1* | 1/2021 | Sabouri-Sichani | H04W 74/0833 |
| 2021/0329703 A1* | 10/2021 | Yang | H04L 5/001 |
| 2021/0329704 A1* | 10/2021 | Yang | H04W 72/23 |
| 2022/0159745 A1* | 5/2022 | Farag | H04L 27/261 |
| 2022/0279398 A1* | 9/2022 | Stanczak | H04W 36/0072 |
| 2022/0312501 A1* | 9/2022 | Lei | H04L 1/1867 |
| 2022/0361246 A1* | 11/2022 | Dong | H04W 72/1268 |

OTHER PUBLICATIONS

Office Action issued in counterpart Japanese Patent Application No. 2021-550794 mailed on Sep. 5, 2023 (6 pages).
3GPP TSG RAN WG1 #98; R1-1908459 "Channel Structure for Two-Step RACH" Samsung; Prague, CZ; Aug. 26-30, 2019 (15 pages).
3GPP TSG RAN WG1 #98; R1-1908181 "On the remaining issues of msgA channel structure" ZTE, Sanechips; Prague, CZ; Aug. 26-30, 2019 (24 pages).

(Continued)

*Primary Examiner* — Lonnie V Sweet
(74) *Attorney, Agent, or Firm* — Osha Bergman Watanabe & Burton LLP

(57) ABSTRACT

A terminal includes a receiving unit that receives information indicating mapping relation between transmission occasions for a random access preamble and transmission occasions for a physical uplink shared channel for a MessageA transmission in a two step random access procedure; and a control unit that selects, based on the mapping relation, a transmission occasion for the physical uplink shared channel for the MessageA transmission in the two step random access procedure.

4 Claims, 17 Drawing Sheets

(56) References Cited

OTHER PUBLICATIONS

3GPP TS 38.211 V15.4.0 "3rd Generation Partnership Project; Technical Specification Group Radio Access Network; NR; Physical channels and modulation (Release 15)" Dec. 2018 (96 pages).
3GPP TSG RAN Meeting #82; RP-182184 "Agenda for RAN #82" RAN chairman; Sorrento, Italy; Dec. 10-13, 2018 (9 pages).
International Search Report issued in International Application No. PCT/JP2019/038656, mailed Apr. 28, 2020 (3 pages).
Written Opinion issued in International Application No. PCT/JP2019/038656; Dated Apr. 28, 2020 (3 pages).
Extended European Search Report issued in counterpart European Patent Application No. 19947498.2, mailed on Apr. 4, 2023 (8 pages).
WI Rapporteur (ZTE); "RAN1 agreements for Rel-16 2-step RACH"; 3GPP TSG RAN WG1 #98, R1-1909914; Prague, CZ; Aug. 26-30, 2019 (15 pages).

* cited by examiner

USER EQUIPMENT AND COMMUNICATION METHOD

TECHNICAL FIELD

The present invention relates to a user equipment and a communication method in a radio communication system.

BACKGROUND ART

For 3GPP Release 16 NR, a study on 2-step RACH has been started. According to 2-step RACH, it is considered that time required for processing of random access channel (RACH) can be reduced and power consumption can be reduced.

The 2-step RACH procedure is performed with two steps. Specifically, a user equipment transmits MessageA to a base station. The base station transmits MessageB to the user equipment. Here, the MessageA is a message that is equivalent to Message1+Message3 in a 4-step RACH procedure. Furthermore, the MessageB is a message that is equivalent to Message2+Message4 in a 4-step RACH procedure.

RELATED ART DOCUMENT

Non-Patent Document

[Non-Patent Document]

Non-Patent Document 1: 3GPP TS 38.211 V15.4.0(2018-12)

Non-Patent Document 2: 3GPP TSG RAN Meeting #82, Sorrento, Italy, Dec. 10-13, 2018

SUMMARY OF THE INVENTION

Problem to be Solved by the Invention

It is assumed that a MessageA (MsgA) is preamble+Physical Uplink Shared Channel (PUSCH), and it is assumed that a preamble and PUSCH are not integrated at least from a perspective of a physical. layer.

There is a need for a method of indicating a time resource of a MsgA PUSCH occasion in a case where a configuration periodicity of MsgA PUSCH occasions differs from a configuration periodicity of MsgA RACH occasions.

Means for Solving the Problem

According to an aspect of the present invention, there is provided a terminal including a receiving unit that receives information indicating mapping relation between transmission occasions for a random access preamble and transmission occasions for a physical uplink shared channel for a MessageA transmission in a two step random access procedure; and a control unit that selects, based on the mapping relation, a transmission occasion for the physical uplink shared channel for the MessageA transmission in the two step random access procedure.

Advantage of the Invention

According to an embodiment, there is provided a method of indicating a time resource of a MsgA PUSCH occasion in a case where a configuration periodicity of MsgA PUSCH occasions differs from a configuration periodicity of MsgA RACH occasions.

EMBODIMENTS OF THE INVENTION

Hereinafter, embodiments of the present invention are described with reference to the drawings. The embodiments described below are merely examples, and the embodiments to which the present invention is applied are not limited to the following embodiments.

The radio communication system according to the following embodiments is assumed to basically conform to NR, but this is an example, and the radio communication system according to the embodiments may conform to a radio communication system other than NR (e.g., LTE) in whole or in part.

(Overall System Configuration)

Figure 1:
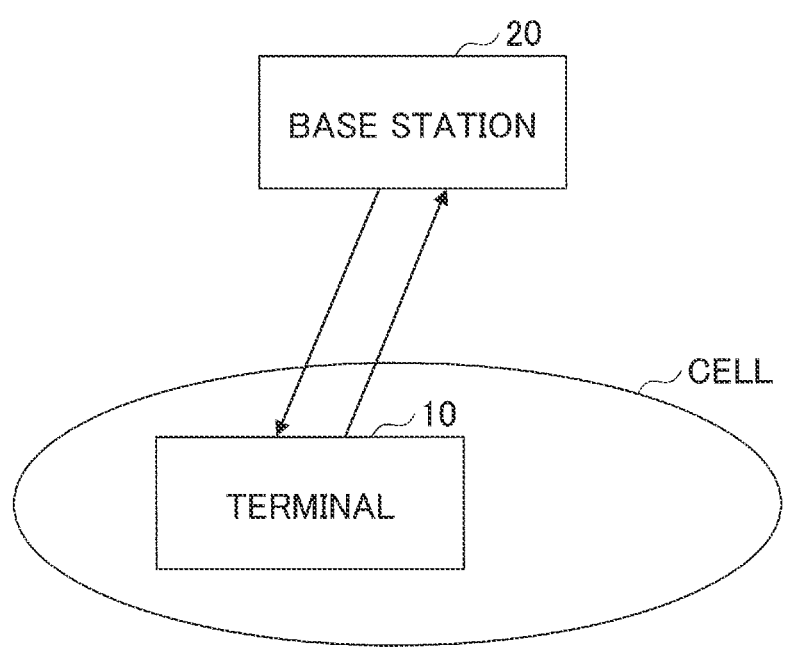
FIG. 1 is a configuration diagram of a communication system according to an embodiment.

FIG. 1 illustrates a configuration diagram of a radio communication system according to the present embodiment. The radio communication system according to the embodiments includes a terminal 10 and a base station 20 as illustrated in FIG. 1. In FIG. 1, one terminal 10 and one base station 20 are illustrated. This is an example, and there may be a plurality of units of the terminal 10 and a plurality of the base stations 20.

The terminal 10 is a communication device having a radio communication function, such as a smartphone, a cellular phone, a tablet, a wearable terminal, and a communication module for M2M (Machine-to-Machine). The terminal 10 wirelessly connects to the base station 20 and utilizes various communication services provided by the radio communication system. The base station 20 is a communication device that provides one or more cells and wirelessly communicates with the terminal 10. Both the terminal 10 and the base station 20 are capable of transmitting and receiving signals by using beamforming. The terminal 10 may also be referred to as a UE, and the base station 20 may be referred to as a gNB.

In the embodiments, the duplex method may be a Time Division Duplex (TDD) method or a Frequency Division Duplex (FDD).

For the 3GPP release 16NR, a study on a 2-step RACH has been started. According to the 2-step RACH, the time required to process a random access channel (RACH) procedure can be reduced and the power consumption can be reduced.

Figure 2:
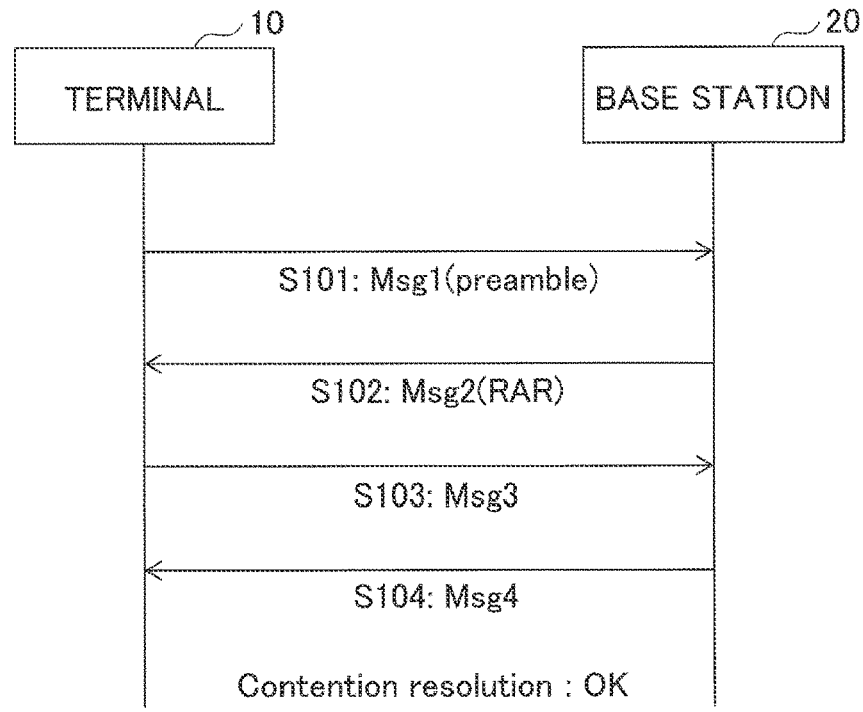
FIG. 2 is a diagram illustrating an example of a 4 step RACH (Contention based random access) procedure.

FIG. 2 illustrates an example of a typical 4-step RACH (Contention Based Random Access) procedure.

In the 4-step RACH procedure illustrated in FIG. 2, first, at step S101, the terminal 10 transmits a Message 1 (random access preamble) to the base station 20. At step S102, the base station 20 transmits a Message2 (random access response (RAR)) to the terminal 10. At step S103, the terminal 10 transmits the Message3 to the base station 20. At step S104, the base station 20 transmits the Message4 to the terminal 10.

Figure 3:
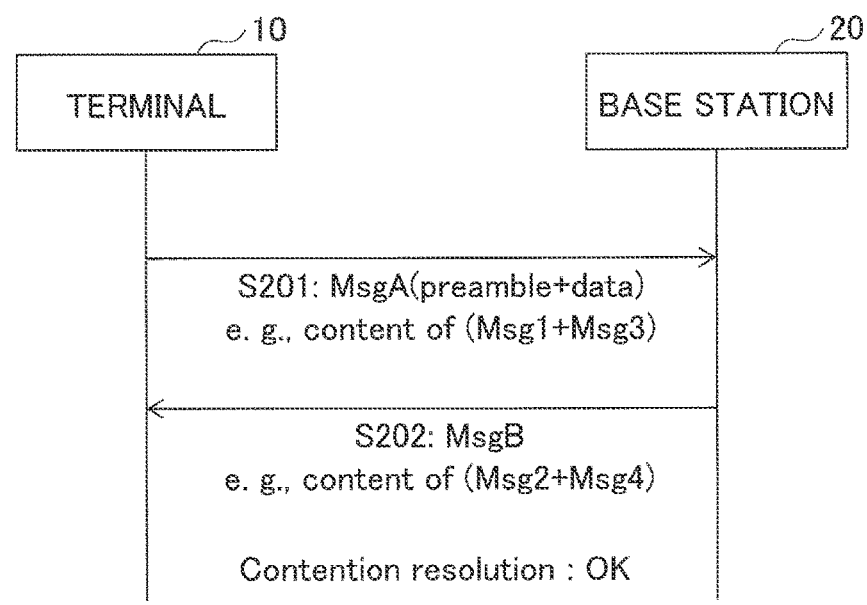
FIG. 3 is a diagram illustrating an example of a 2 step RACH (Contention based random access) procedure.

FIG. 3 illustrates an example of a 2-step RACH (Contention Based Random Access) procedure.

In the 2-step RACH procedure illustrated in FIG. 3, the RACH procedure is performed in two steps. Specifically, at step S201, the terminal 10 transmits the MessageA to the base station 20. At step S202, the base station 20 transmits the Message B to the terminal 10. Here, MessageA is the message equivalent to Message1+Message3 in the 4-step RACH procedure illustrated in FIG. 2. MessageB corresponds to Message2+Message4 in the 4-step RACH procedure illustrated in FIG. 2.

Figure 4:
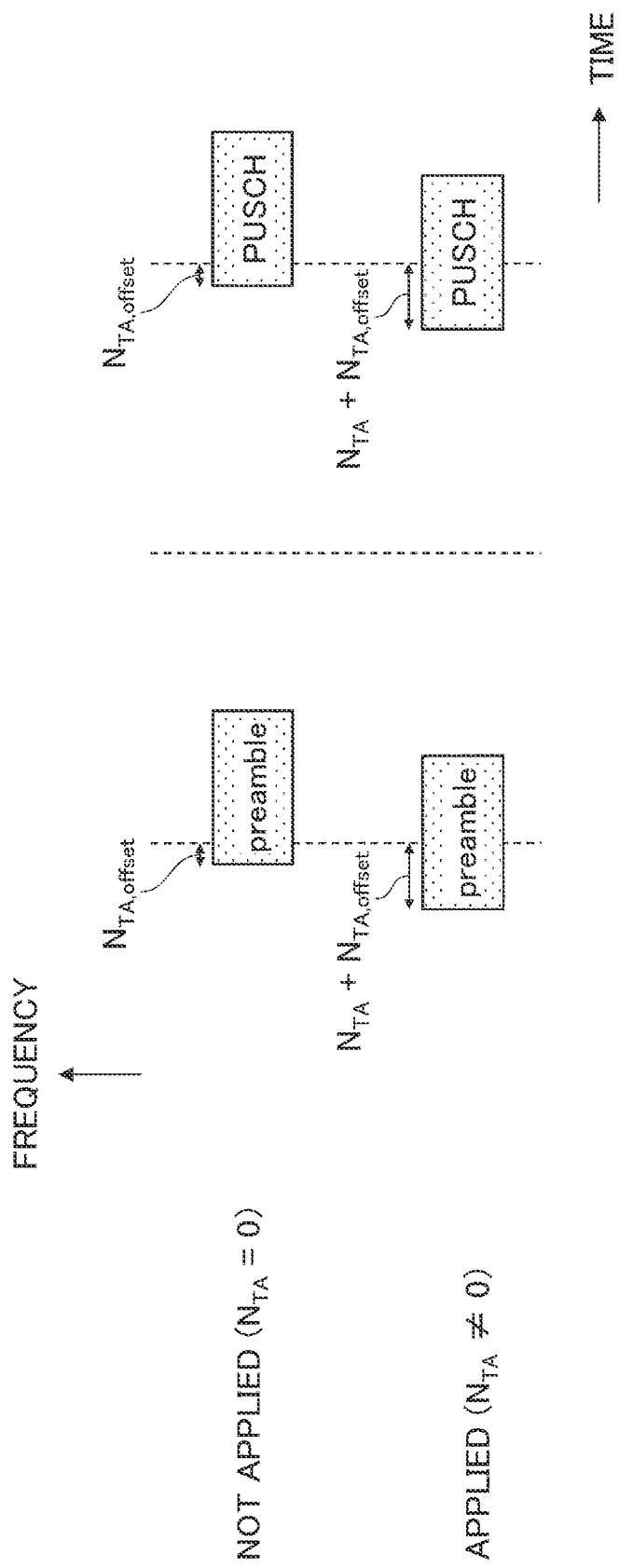
FIG. 4 is a diagram illustrating an example in which timing advance values are set to zero and non-zero in MessageA transmission in a 2 step RACH procedure.

MessageA includes a random access preamble and data sent by Physical Uplink Shared Channel (PUSCH). From a higher layer perspective, MessageA may be considered as a single message. From a physical layer perspective, however, it is assumed that, in MessageA, a random access preamble resource may be a separate resource from a PUSCH resource, for example, as illustrated in FIG. 4. In other words, the transmission of the Message A by the terminal 10 is assumed to be equivalent to the transmission of two signals, that is, the terminal 10 transmits a random access preamble and then, before receiving any message from the base station 20, transmits data (equivalent to the Message 3) on the PUSCH. As MessageA, the order of the random access preamble transmission timing and the PUSCH transmission timing may be reversed.

In the 4-step RACH procedure of the 3GPP release 15, for transmitting a random access preamble, a timing advance value n, is set to zero.

A timing advance value is a value for adjusting timing to be applied to advance a timing for the terminal 10 to perform an uplink signal transmission, taking into consideration the propagation delay until the signal reaches the base station 20, so that uplink signals transmitted from a plurality of units of the terminal 10 reach the base station 20 at the same timing. Accordingly, when a propagation delay for an uplink signal transmitted from the terminal 10 to reach the base station 20 is large, such as a case in which a distance between the terminal 10 and the base station 20 is large, a timing advance value is preferably set to a large value. The timing advance value is calculated at the base station 20 upon receiving a random access preamble in the RACH procedure. Accordingly, when a random access preamble is transmitted, $N_{TA}$ is set to zero.

However, even if $N_{TA}$ is set to zero, a timing at which the terminal 10 transmits an uplink signal may shift forward in a time direction compared to a reference timing determined based on reception of a downlink signal from the base station 20. In general, an uplink frame timing shifts forward in the time direction by the amount $(N_{TA}+N_{TA,offset})T_c$, compared to a downlink frame timing. Accordingly, even if $N_{TA}$ is set to zero for transmission of a preamble, a timing for transmitting an uplink signal shifts forward in the time direction by the amount $N_{TA,offset} \times T_c$, compared to a timing for transmitting a downlink signal.

Currently, it is discussed in the 3GPP meeting to apply contention free random access to a 2 step RACH procedure, and it assumed that the contention free random access is applied to the 2 step RACH procedure.

Details of the MessageA (MsgA) are currently discussed in the 3GPP. Basically, a preamble+a PUSCH is referred to as the MsgA. It is assumed that the preamble and the PUSCH are not integrated, at least, from the perspective of a physical layer. For example, it is assumed that transmissions of the preamble and the PUSCH having separated resources are collectively referred to as the MsgA.

A MsgA PUSCH occasion is a single MsgA PUSCH resource. Furthermore, a MsgA RACH occasion a single MsgA preamble resource. The MsgA PUSCH occasion and the MsgA RACH occasion are indicated as different resources.

It has been studied to define a correspondence relationship between a MsgA PUSCH occasion and a MsgA RACH occasion (the correspondence of which Msg PUSCH is transmitted by the terminal 10 that has transmitted the MsgA RACH). As the correspondence relationship, detailed correspondence has been studied, including one-to-one, many-to-one, one-to-many, and many-to-many.

As a method of indicating a time resource of a MsgA PUSCH occasion, for example, in a case where the configuration periodicities of the MsgA RACH occasions and the MsgA PUSCH occasions are the same, it has been studied to indicate the position of the time resource of the MsgA PUSCH occasion by using the time offset from the start position of the RACH slot of the MsgA RACH occasion.

(Problem)

It is necessary to appropriately indicate/specify the configuration periodicity of the MsgA PUSCH occasions taking into account the correspondence with the MsgA RACH occasions and the method of indicating the resource.

There is a need to appropriately specify a method of indicating a time resource of a MsgA PUSCH occasion and an operation of the terminal 10 in a case where the configuration periodicities of the MsgA RACH occasions and the MsgA PUSCH occasions are different.

(Proposal 1)

A relationship between the configuration periodicity of the MsgA RACH occasions and the configuration periodicity of the MsgA PUSCH occasions may be specified. For example, the relationship between the configuration periodicity of MsgA RACH occasions and the configuration periodicity of the MsgA PUSCH occasions may be limited to a specific relationship. A notification of the specified relationship between the configuration periodicities may be transmitted from the base station 20 to the terminal 10.

(Proposal 1-1)

The configuration periodicity of the MsgA PUSCH occasions may be set to be greater than or equal to the configuration periodicity of the MsgA RACH occasions.

(Proposal 1-2)

The configuration periodicity of the MsgA PUSCH occasions may be set to be less than or equal to the configuration periodicity of the MsgA RACH occasions.

(Proposal 1-3)

The configuration periodicity of the MsgA PUSCH occasions may be the same as the configuration periodicity of the MsgA RACH occasions. In this case, the configuration periodicity of the MsgA PUSCH occasions is determined when the configuration periodicity of the MsgA RACH occasions is indicated to the terminal 10.

(Proposal 1-4)

The configuration periodicity of the MsgA PUSCH occasions mar be greater than, less than, or equal to the configuration periodicity of the MsgA RACH occasions. The configuration periodicity of the MsgA RACH occasions may be defined by an indication method/specifying method of the MsgA PUSCH occasions.

For the above-described Proposals 1-1 to 1-4, in the cases where the configuration periodicity of the MsgA PUSCH occasions is larger than, less than, or equal to the configuration periodicity of the MsgA RACH occasions, different methods of indicating the resource positions of the MsgA PUSCH occasions may be specified and different methods of transmitting/retransmitting the MsgA by the terminal 10 may be specified/indicated, respectively. Furthermore, in the above-described cases, the selection methods for selecting the 2-step RACH or the 4-step RACH by the terminal 10 may differ.

(Proposal 2)

As the indication method/specifying method of the configuration periodicity of the MsgA PUSCH occasions, for example, the methods according Proposal 2-1 to Proposal 2-4 below can be considered.

(Proposal 2-1)

The base station 20 may indicate the configuration periodicity of the MsgA PUSCH occasions by indicating, to the terminal 10, a relative value (e.g., a ratio) of the configuration periodicity of the MsgA PUSCH occasions with respect to the configuration periodicity of the MsgA RACH occasions.

For example, suppose that the base station 20 indicates "2" to the terminal 10. In this case, if the configuration periodicity of the MsgA RACH occasions is 20 ms, the configuration periodicity of the MsgA PUSCH occasions may be 40 ms.

For example, suppose that the base station 20 indicates "½" to the terminal 10. In this case, if the configuration periodicity of the MsgA RACH occasions is 20 ms, the configuration periodicity of the MsgA PUSCH occasions may be 10 ms.

(Proposal 2-2)

The base station 20 may indicate, to the terminal 10, the configuration periodicity of the MsgA PUSCH occasions by indicating resource positions of the MsgA PUSCH occasions instead of directly indicating the configuration periodicity of the MsgA PUSCH occasions to the terminal 10.

For example, the base station 20 may indicate, to the terminal 10, the configuration periodicity of the MsgA PUSCH occasions by specifying one or more PRACH slots (or RACH occasions) as the starting position of the time offset as the resource of the MsgA PUSCH occasions.

For example, the base station 20 may indicate, to the terminal 10, the resource position of the MsgA PUSCH occasions by a time offset obtained by only considering the PRACH slot included in the configuration periodicity with an even number of the MsgA RACH occasions. In this case, it is assumed that the configuration periodicity of the MsgA PUSCH occasions is twice the configuration periodicity of the MsgA RACH occasions.

(Proposal 2-3)

The base station 20 may indicate, to the terminal 10, the configuration periodicity of the MsgA PUSCH occasions by indicating, to the terminal 10, the mapping relationship between the MsgA RACH occasions and the MsgA PUSCH occasions, instead of directly indicating, to the terminal 10, the configuration periodicity of the MsgA PUSCH occasions.

For example, the terminal 10 may define the configuration periodicity of the MsgA PUSCH occasions based on the unit with which the mapping relationship is repeated.

The base station 20 may indicate, to the terminal 10, the configuration periodicity of the MsgA PUSCH occasions, independently of the configuration periodicity of the MsgA RACH occasions.

For example, the base station 20 may select the configuration periodicity of the MsgA PUSCH occasions (e.g., 10 ms, 20 ms, 40 ms, 80 ms, 160 ms) from a range equivalent to the range of values that can be taken as the configuration periodicity of the MsgA RACH occasions, and indicate the selected configuration periodicity of the MsgA PUSCH occasions to the terminal 10.

For example, the base station 20 may select the configuration periodicity (e.g., 5 ms or 320 ms) of the MsgA PUSCH concessions from a range different from the range of values that can be taken as the configuration periodicity of the MsgA RACH occasions, and indicate the selected configuration periodicity of the MsgA PUSCH occasions to the terminal 10.

For example, the base station 20 may collectively indicate, to the terminal 10, the configuration periodicity of the MsgA PUSCH occasions as the MsgA PUSCH-related configuration (e.g., the index may be indicated in a table format).

For example, the range of values that can be selected as the configuration periodicity of the MsgA RACH occasions may be equal to or different from the range of values that can be selected as the configuration periodicity of the RACH occasions in the 4-step RACH.

For example, the value that can be selected as the configuration periodicity of MsgA RACH occasions may be 10 ms, 20 ms, 40 ms, 80 ms, 160 ms, or 320 ms (the value that can be selected as the configuration periodicity of the RACH occasions in the 4-step RACH is 10 ms, 20 ms, 40 ms, 80 ms, or 160 ms). Note that the configuration information related to the configuration periodicity of the MsgA RACH occasions in the 2-step RACH differs from the configuration information of the configuration periodicity of the MsgA RACH occasions in the 4-step RACH. Accordingly, the terminal 10 may be able to detect that the configuration periodicity of the RACH occasions indicated by the base station 20 is the configuration periodicity for the 2-step RACH or the configuration periodicity for the 4-step RACH.

(Proposal 3)

As for the mapping relationship between the MsgA RACH occasions and the MsgA PUSCH occasions, for example, the relationships according to Proposal 3-1 to Proposal 3-3 below are considered.

Figure 5:
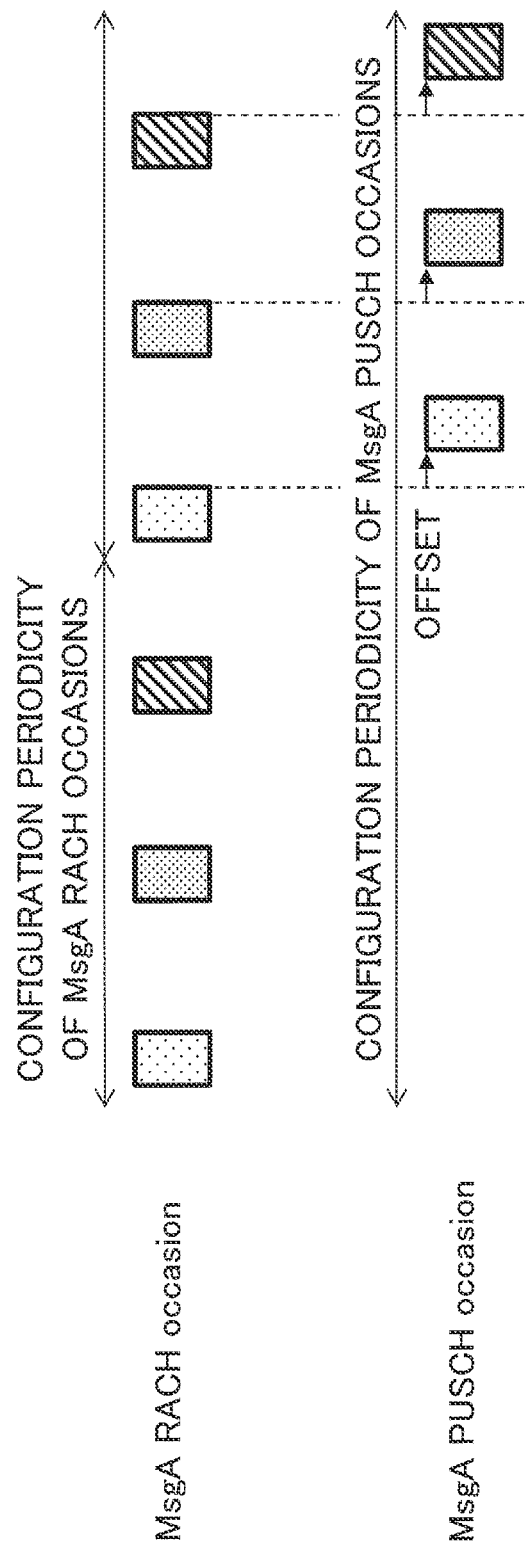
FIG. 5 is a diagram illustrating an example of a method of Proposal 4-1.

(Proposal 3-1)
For example, the mapping relationship between the MsgA RACH occasions and the MsgA PUSCH occasions may be repeated in units of the configuration periodicity of the MsgA RACH occasions.
(Proposal 3-2)
For example, the mapping relationship between the MsgA RACH occasions and the MsgA PUSCH occasions may be repeated in units of the configuration periodicity of the MsgA PUSCH occasions.
(Proposal 3-3)
For example, the mapping relationship between the MsgA RACH occasions and the MsgA PUSCH occasions may be repeated independently of the configuration periodicity of the MsgA RACH occasions/the configuration periodicity of the MsgA PUSCH occasions.
(Proposal 3-4)
For example, the mapping relationship between the MsgA RACH occasions and the MsgA PUSCH occasions may be repeated in units of the larger configuration periodicity from the configuration periodicity of the MsgA RACH occasions and the configuration periodicity of the MsgA PUSCH occasions.
(Proposal 3-5)
For example, the mapping relationship between the MsgA RACH occasions and the MsgA PUSCH occasions may be repeated in units of the smaller configuration periodicity from the configuration periodicity of the MsgA RACH occasions and the configuration periodicity of the MsgA PUSCH occasions.
(Proposal 4)
In a case where the configuration periodicity of the MsgA PUSCH occasions is greater than the configuration periodicity of the MsgA RACH occasions, for example, the base station 20 may indicate, to the terminal 10, the time resource position of the MsgA PUSCH occasions by a method, such as the methods according to Proposal 4-1 to Proposal 4-3 below.
(Proposal 4-1)
For example, the base station 20 may use only one of the MsgA RACH occasions in the configuration periodicity of the MsgA PUSCH occasions, and the base station 20 may indicate the time resource position of the MsgA PUSCH occasion by a time offset.
FIG. 5 is a diagram illustrating an example of the method of Proposed 4-1. In the example of FIG. 5, for example, assume that the configuration periodicity of the MsgA RACH occasions is 10 ms and the configuration periodicity of the MsgA PUSCH occasions is 20 ms. In this case, two configuration periodicities of the MsgA RACH occasions may be included within the configuration periodicity of the MsgA PUSCH occasions. For example, the base station 20 may set the time resource position of the MsgA PUSCH occasions by a time offset, while using only the MsgA RACH occasions in one configuration periodicity of the MsgA RACH occasions in the two configuration periodicities of the MsgA RACH occasions, and the base station 20 may indicate, to the terminal 10, the time resource position of the MsgA PUSCH occasions.
For example, the base station 20 may indicate, to the terminal 10, a MsgA RACH occasion of which configuration periodicity of the MsgA RACH occasions is to be used. For example, when the configuration periodicity of the MsgA RACH occasions is 10 ms and the configuration periodicity of the MsgA PUSCH occasions is 40 ms, the base station 20 may indicate, to the terminal 10, that the configuration periodicity of the MsgA RACH occasions corresponding to 0 to 9 ms is to be used, namely, the first configuration periodicity of the MsgA RACH occasions in the configuration periodicity of the MsgA PUSCH occasions is to be used. Alternatively, the base station 20 may indicate, to the terminal 10, that the configuration periodicity of the MsgA RACH occasions corresponding to 30 to 39 ms is to be used, namely, the last configuration periodicity of the MsgA RACH occasions in the configuration periodicity of the MsgA PUSCH occasions is to be used. That is, the base station 20 may indicate, to the terminal 10, which configuration periodicity of the MsgA RACH occasions from among 0-9 ms, 10-19 ms, 20-29 ms, and 30-39 ms is to be used.

Figure 6:
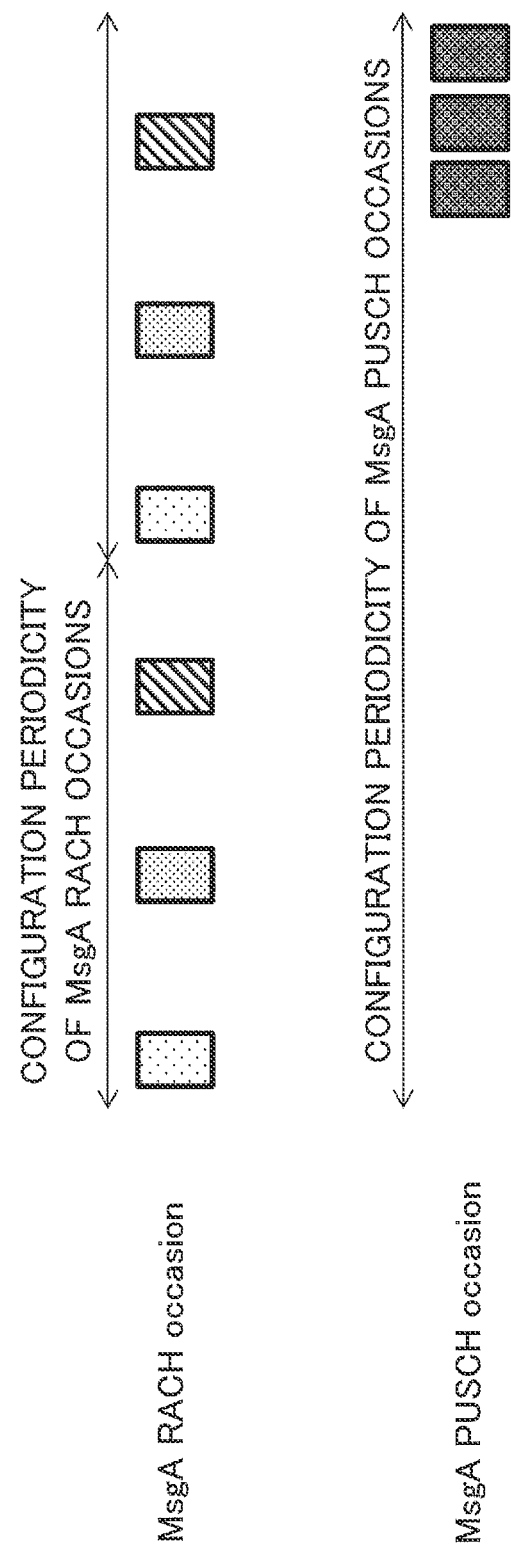
FIG. 6 is a diagram illustrating an example of a method of Proposal 4-2.
Figure 7:
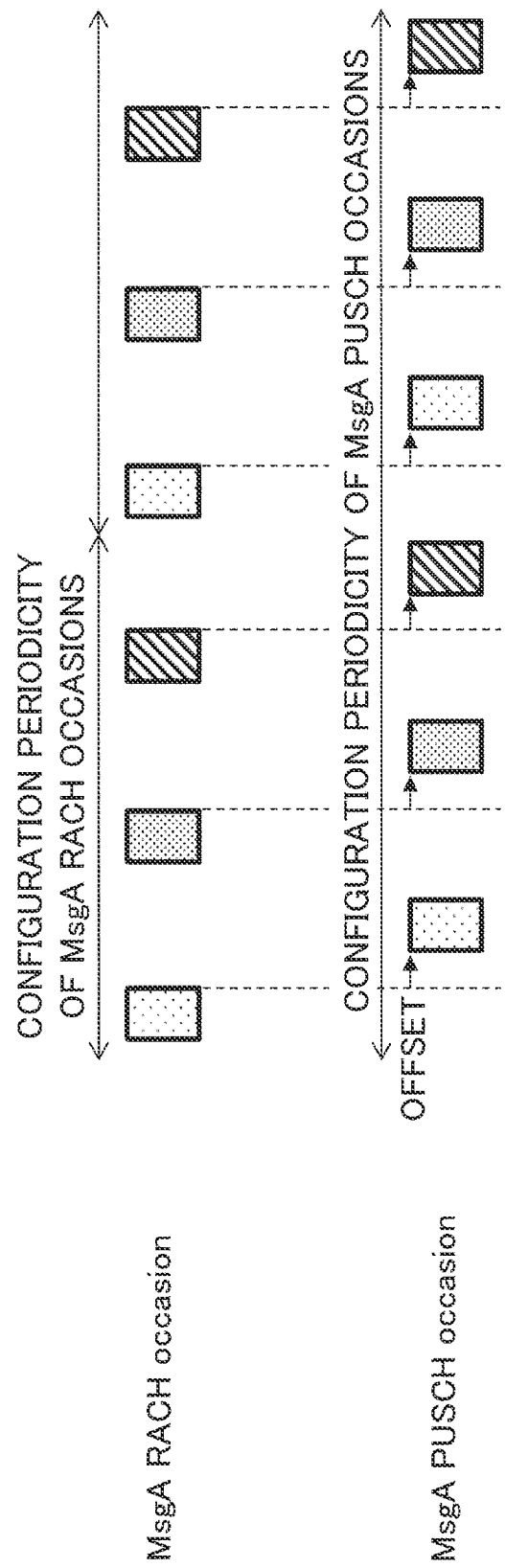
FIG. 7 is a diagram illustrating an example of a method of Proposal 4-3.

For example, the MsgA RACH occasions and the MsgA PUSCH occasions having correspondence based on a time offset may be associated in the MsgA transmission by the terminal 10, and the association of the MsgA transmission may be independent of the correspondence.
(Proposal 4-2)
For example, the base station 20 may indicate, to the terminal 10, the time resource position of the MsgA PUSCH occasions, independently of the MsgA RACH occasions.
FIG. 6 is a diagram illustrating an example of the method of Proposal 4-2. As illustrated in FIG. 6, the position of the time resource of the MsgA PUSCH occasions may be specified, independently of the MsgA RACH occasions.
For example, as the association in the MsgA transmission by the terminal 10, it may be indicated/specified that the MsgA RACH occasion of which configuration periodicity of the MsgA RACH occasions and the MsgA PUSCH occasion are to be associated. For example, when the configuration periodicity of the MsgA RACH occasions is 10 ms and the configuration periodicity of the MsgA PUSCH occasions is 40 ms, it may be assumed that the configuration periodicity of the MsgA RACH occasions corresponding to 0-9 ms is to be associated, namely, the first configuration periodicity of the MsgA RACH occasion in the configuration periodicity of the MsgA PUSCH occasions is to be associated. Alternatively, it may be assumed that the configuration periodicity of the MsgA RACH occasions corresponding to 30-39 ms is to be associated, namely, the last configuration periodicity of the MsgA RACH occasion in the configuration periodicity of the MsgA PUSCH occasions is to be associated. Namely, the base station 20 may indicate, to the terminal 10, which configuration periodicity of the MsgA RACH occasions from among 0-9 ms, 10-19 ms, 20-29 ms, and 30-39 ms is to be associated.
(Proposal 4-3)
For example, the base station 20 may indicate, to the terminal 10, the time resource position of the MsgA PUSCH occasions by time offset using all the MsgA RACH occasions within the configuration periodicity of the MsgA RACH occasion.
FIG. 7 is a diagram illustrating an example of the method of Proposal 4-3. As illustrated in FIG. 7, the time resource position of the MsgA PUSCH occasions may be defined by a time offset using all the MsgA RACH occasions in the configuration periodicity of the MsgA RACH occasions.
The association between the MsgA RACH occasion and the MsgA PUSCH occasion in the MsgA transmission by the terminal 10 may be different from the correspondence based on time offset.
(Proposal 5)
A case is assumed in which the configuration periodicity of the MsgA PUSCH occasions is greater than the configuration periodicity of the MsgA RACH occasions in the examples of Proposals 5-1 and 5-2 below.

(Proposal 5-1)

For example, mapping from the MsgA RACH occasions in the configuration periodicity of one MsgA RACH occasions onto a cycle of the MsgA PUSCH occasions may be performed.

For example, assume that the base station 20 indicates the time resource position of the MsgA PUSCH occasions by a time offset using only a MsgA RACH occasion within the configuration periodicity of the MsgA PUSCH occasions (based on Proposal 4-1).

(Proposal 5-1-1)

Figure 8:
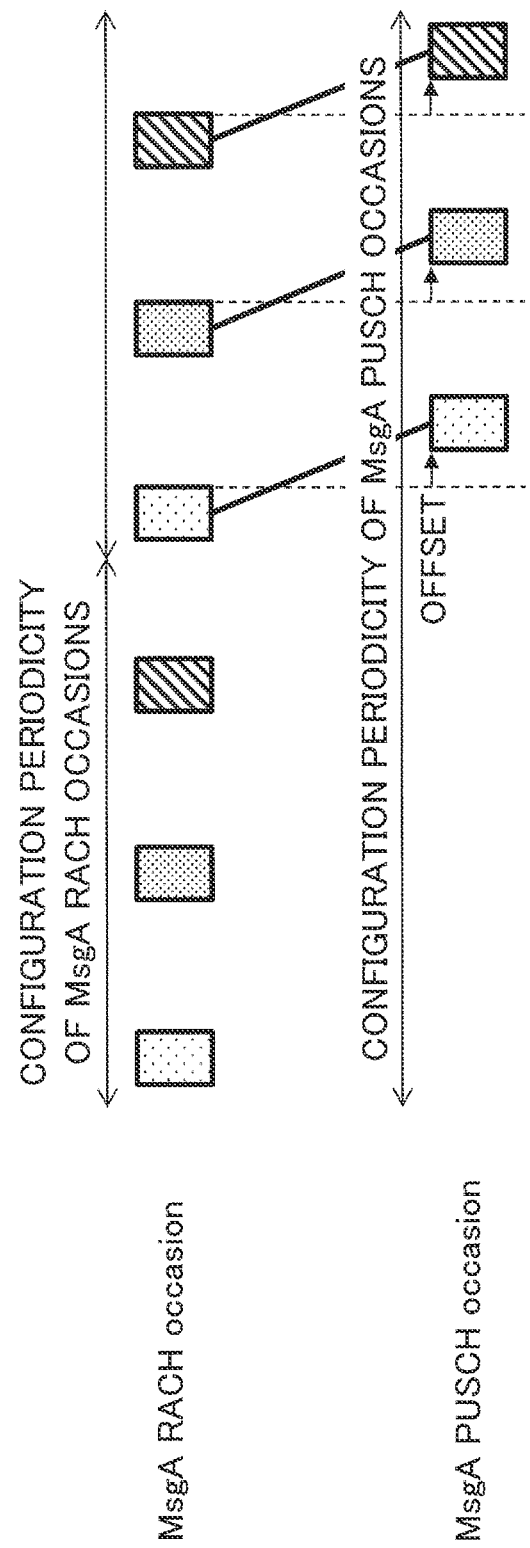
FIG. 8 is a diagram illustrating an example of a method of Proposal 5-1-1.

FIG. 8 is a diagram illustrating an example of Proposal 5-1-1. For example, the MsgA RACH occasion in the configuration periodicity of the MsgA RACH occasions that is used as the start of the time offset of the resource position of the MsgA PUSCH occasion is associated with the corresponding MsgA PUSCH occasion in the MsgA transmission by the terminal 10, and there is no association from the MsgA RACH occasions in another configuration periodicity of the MsgA RACH occasions with a MsgA PUSCH occasion. Namely, when the terminal 10 selects the MsgA RACH occasion without a corresponding MsgA PUSCH occasion, the terminal 10 does not transmit the MsgA PUSCH. In this case, for example, the terminal 10 may perform the 4-step RACH operation or an operation other than the 4-step RACH. For example, it may be specified that, if the terminal 10 performs the 2-step RACH operation, the terminal 10 does not select a MsgA RACH occasion without a corresponding MsgA PUSCH occasion.

(Proposal 5-1-2)

Figure 9:
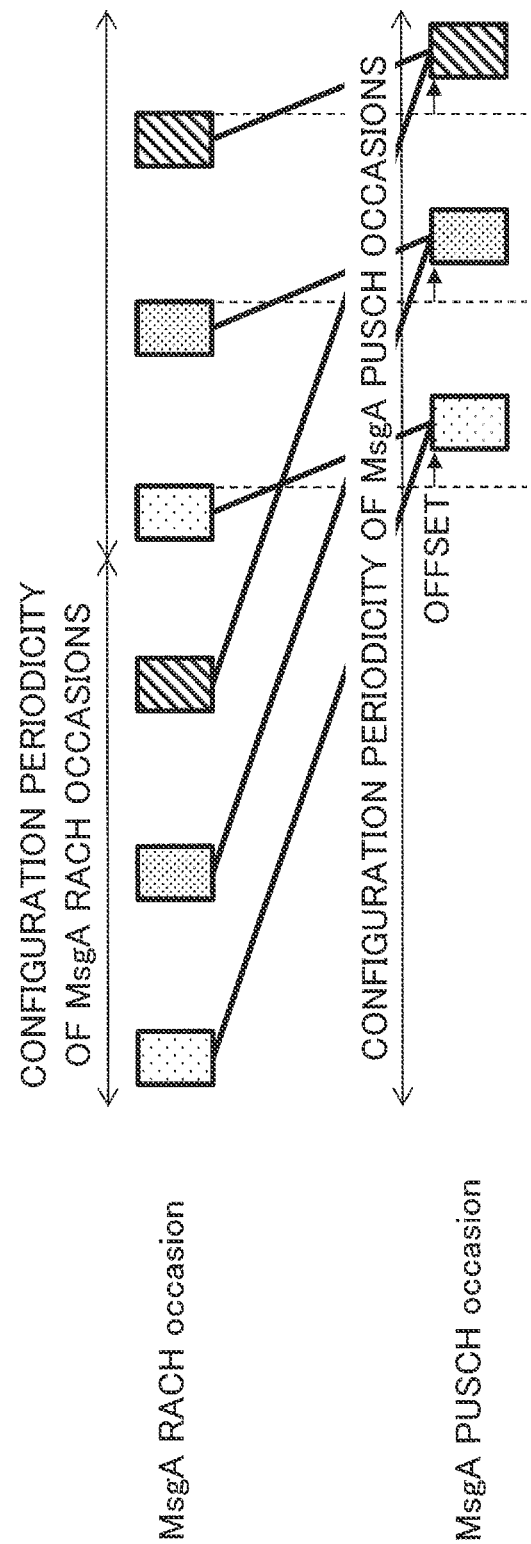
FIG. 9 is a diagram illustrating an example of Proposal 5-1-2.

FIG. 9 is a diagram illustrating an example of Proposal 5-1-2. For example, the MsgA RACH occasion in the configuration periodicity of the MsgA RACH occasions that is used as the start of the time offset of the resource position of the MsgA PUSCH occasion is associated with the corresponding MsgA PUSCH occasion in the MsgA transmission by the terminal 10, and the association in the configuration periodicity of the MsgA RACH occasions may be repeated from the MsgA RACH occasions in another configuration periodicity of the MsgA RACH occasions.

For example, suppose that the base station 20 indicates, to the terminal 10, the time resource position of the MsgA PUSCH occasions independently of the MsgA RACH occasions (based on Proposal 4-2).

(Proposal 5-1-3)

For example, in a case where, in the MsgA transmission by the terminal 10, a MsgA RACH occasion in a configuration periodicity of the MsgA RACH occasion is associated with a MsgA PUSCH occasion, a MsgA RACH occasion in another configuration periodicity of the MsgA RACH occasions need not be associated with any MsgA PUSCH occasion. Namely, if the terminal 10 selects a MsgA RACH occasion without a MsgA PUSCH occasion, the terminal 10 need not transmit a MsgA PUSCH. In this case, the terminal 10 may perform the 4-step RACH operation or an operation other than the 4-step RACH. For example, it may be specified that, if the terminal 10 performs the 2-step RACH operation, the terminal 10 does not select a MsgA RACH occasion without a corresponding MsgA PUSCH occasion.

(Proposal 5-1-4)

For example, if, in a MsgA transmission by the terminal 10, a MsgA RACH occasion in the configuration periodicity of the MsgA RACH occasions is associated with a MsgA PUSCH occasion, similar association between a MsgA RACH occasion in another configuration periodicity of the MsgA RACH occasions and the MsgA PUSCH occasion may be repeated.

(Proposal 5-2)

Figure 10:
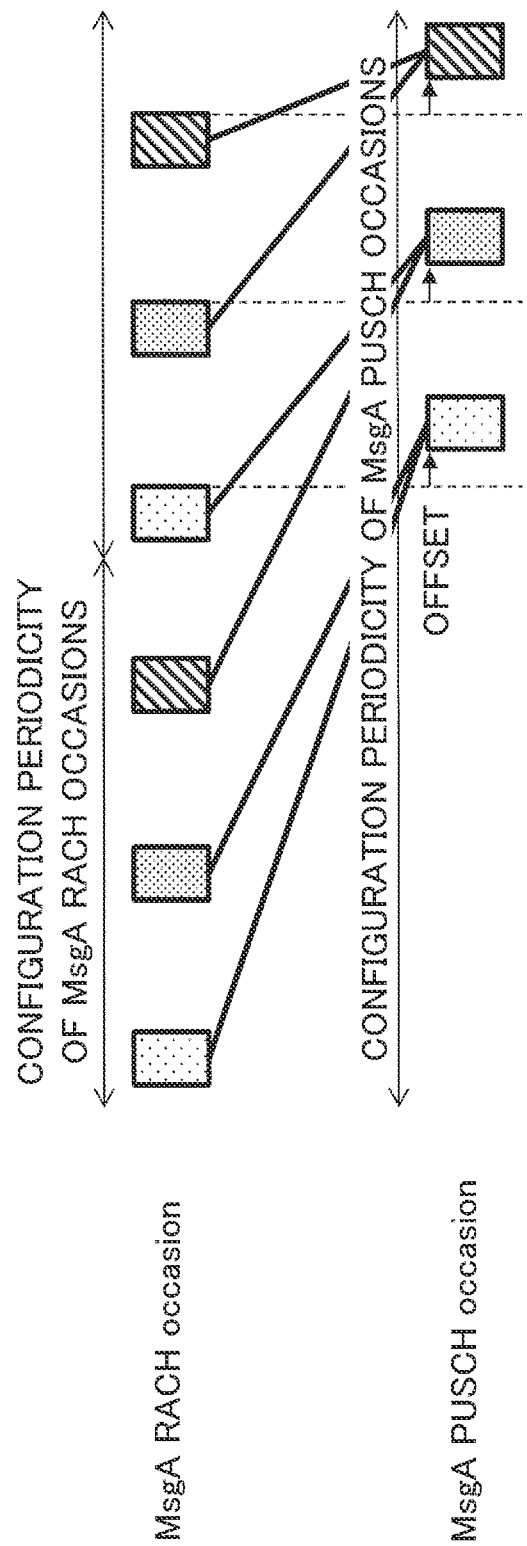
FIG. 10 is a diagram illustrating an example of mapping from MsgA RACH occasions in a plurality of MsgA RACH occasions onto one cycle of MsgA PUSCH occasions.

For example, as illustrated in FIG. 10, mapping may be performed from the MsgA RACH occasions in multiple configuration periodicities of the MsgA RACH occasions onto a cycle of the MsgA PUSCH occasions.

For example, it is assumed that the base station 20 indicates, to the terminal 10, the time resource position of the MsgA PUSCH occasions by a time offset using all the MsgA RACH occasions within the configuration periodicity of the MsgA RACH occasions (based on Proposal 4-3).

(Proposal 5-3)

Figure 11:
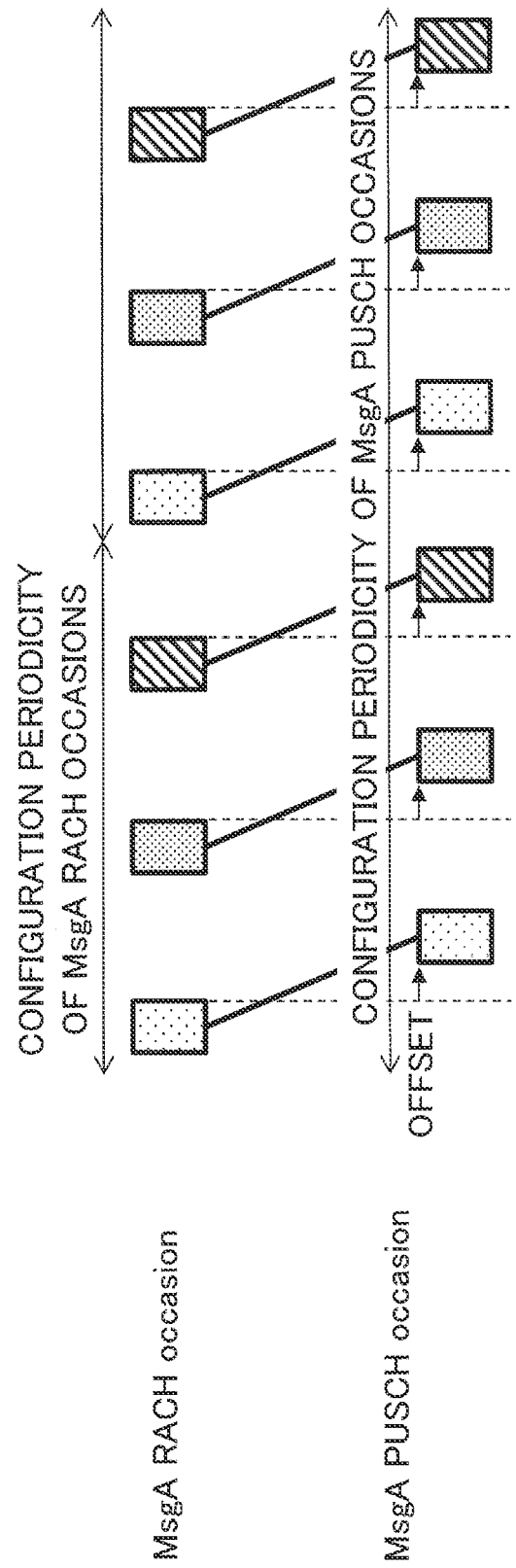
FIG. 11 is a diagram illustrating an example of Proposal 5-3.

FIG. 11 is a diagram illustrating an example of Proposal 5-3. The association between the MsgA RACH occasion and the MsgA PUSCH occasion in the MsgA transmission by the terminal 10 may be the same as the correspondence based on the time offset.

(Proposal 5-4)

For example, the association between the MsgA RACH occasion and the MsgA PUSCH occasion in the MsgA transmission by the terminal 10 may be different from the correspondence based on the time offset. For example, in a configuration periodicity of the MsgA RACH occasions and a configuration periodicity of the MsgA PUSCH occasions, based on the indicated/specified association, the association may be made sequentially starting from the beginning of each configuration periodicity.

(Proposal 5-4-1)

Figure 12:
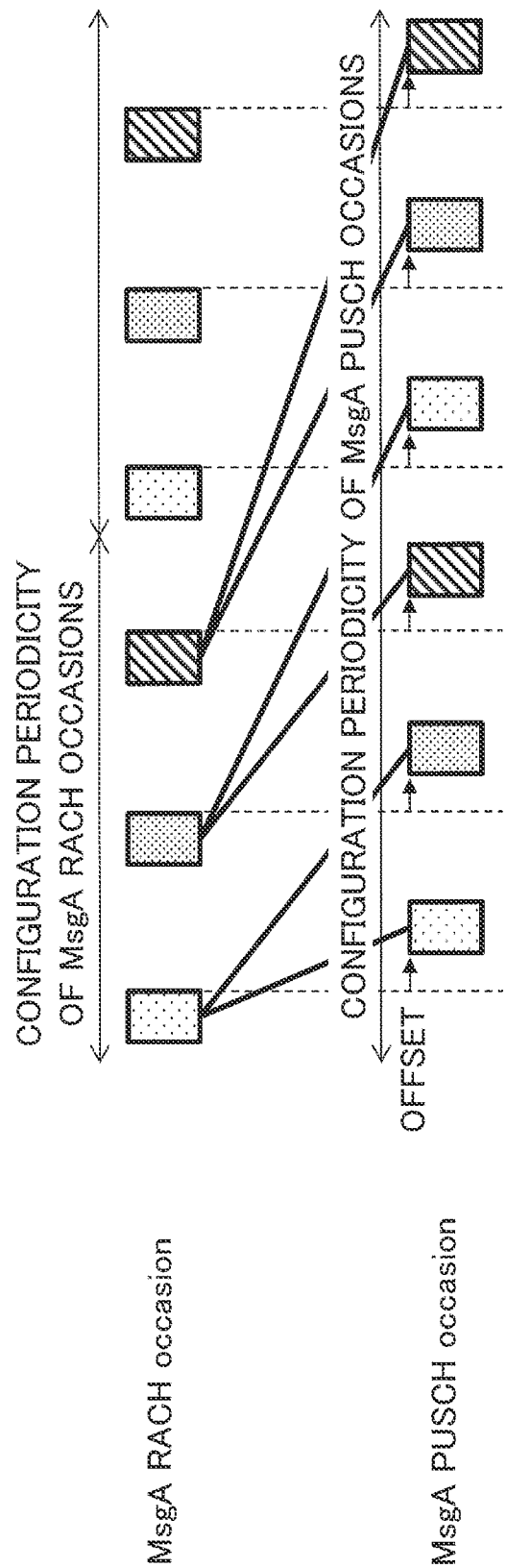
FIG. 12 is a diagram illustrating an example of Proposal 5-4-1.

FIG. 12 is a diagram illustrating an example of Proposal 5-4-1. When there is no association between a MsgA RACH occasion in another configuration periodicity of the MsgA RACH occasions and a MsgA PUSCH occasion, i.e., when a MsgA RACH occasion without a corresponding MsgA PUSCH occasion is selected, the terminal 10 need not transmit the MsgA PUSCH. In this case, the terminal 10 may perform the 4-step RACH operation, or an operation other than the 4-step RACH. For example, it may be specified that, if the terminal 10 performs the 2-step RACH operation, the terminal 10 does not select a MsgA RACH occasion without a corresponding MsgA PUSCH occasion.

(Proposal 5-4-2)

Figure 13:
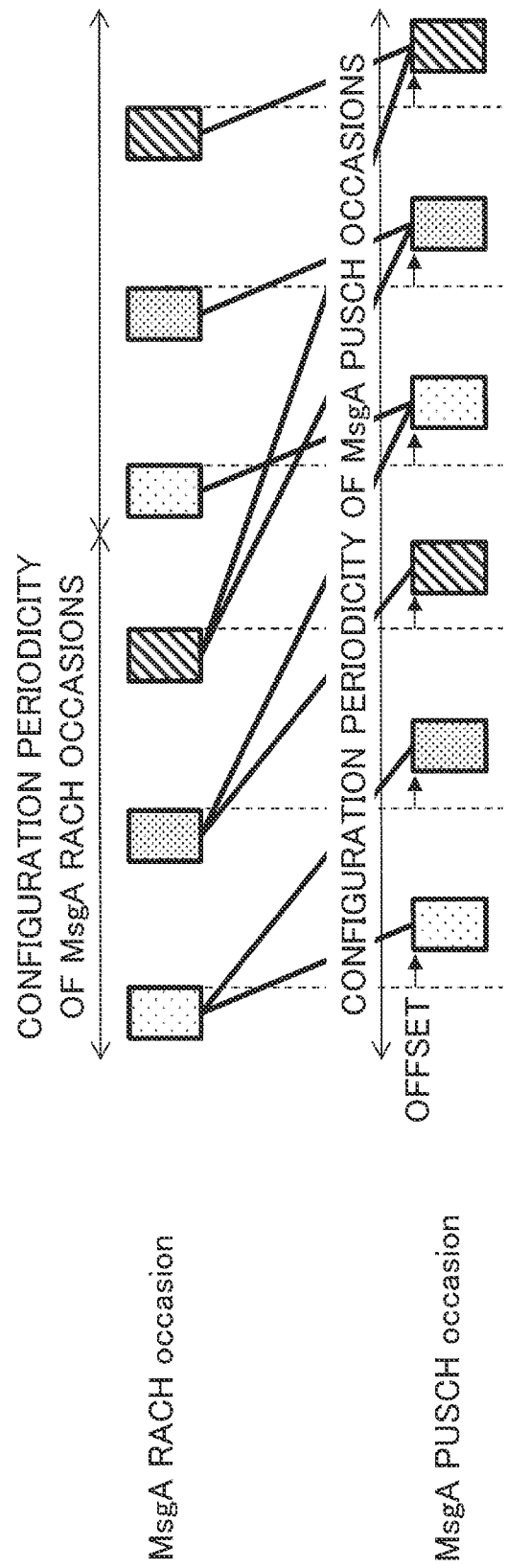
FIG. 13 is a diagram illustrating an example of Proposal 5-4-2.

FIG. 13 is a diagram illustrating an example of Proposal 5-4-2. In the MsgA transmission by the terminal 10, if a MsgA RACH occasion in the configuration periodicity of the MsgA RACH occasions is associated with a MsgA PUSCH occasions, similar association between a MsgA RACH occasion in another configuration periodicity of the MsgA RACH occasions and a MsgA PUSCH occasion may be repeated. For example, for a MsgA PUSCH occasion having a resource earlier in a direction of time than a MsgA RACH occasion, mapping may or may not be performed. For example, no mapping may be performed, or a mapping may be performed between a MsgA RACH occasion and MsgA PUSCH occasions included in different configuration periodicities of the MsgA PUSCH occasions.

(Proposal 6)

In the examples of Proposals 6-1 to 6-3 below, it is assumed that the configuration periodicity of the MsgA PUSCH occasions is less than the configuration periodicity of the MsgA RACH occasions.

(Proposal 6-1)

Figure 14:
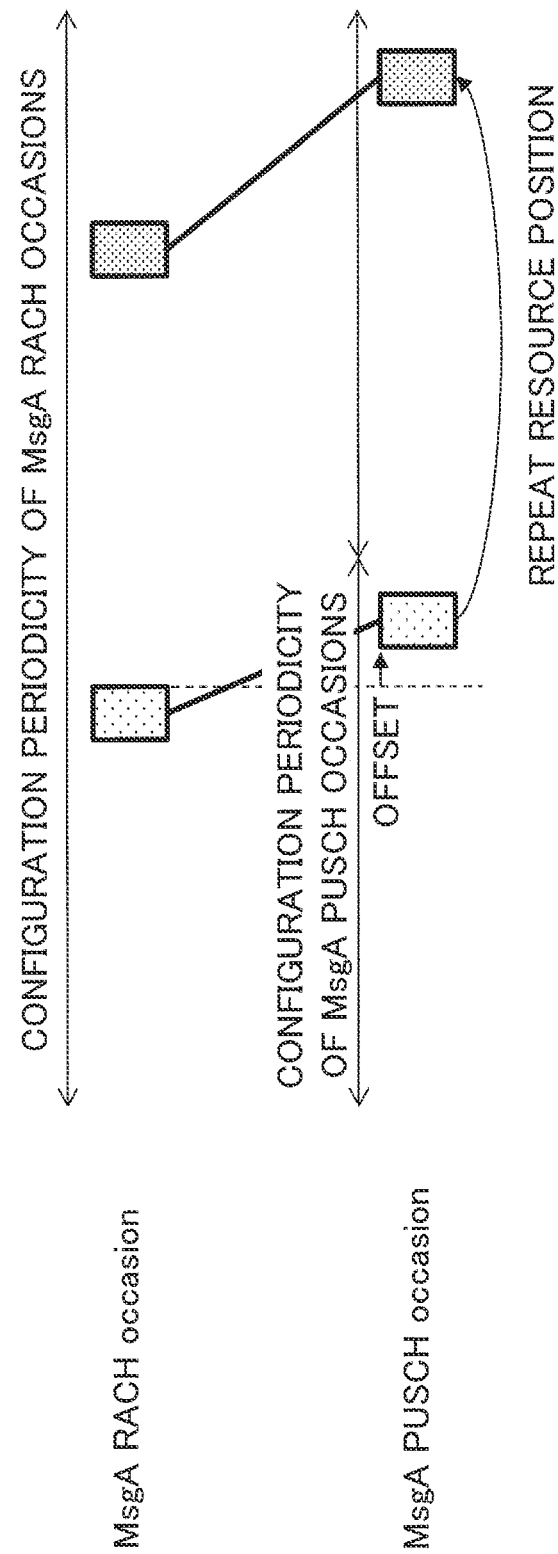
FIG. 14 is a diagram illustrating an example of Proposal 6-1.

FIG. 14 is a diagram illustrating an example of Proposal 6-1. The base station 20 may indicate, to the terminal 10, a time resource position of the MsgA PUSCH occasions by a time offset using only a portion of the MsgA RACH occasions in the configuration periodicity of the MsgA RACH occasions. For example, the base station 20 may indicate which MsgA RACH occasion is to be used. The MsgA PUSCH occasion determined by the indicated MsgA RACH occasion may be repeated for each configuration periodicity of the MsgA PUSCH occasions.

(Proposal 6-2)

The base station 20 may indicate, to the terminal 10, a time resource position of the MsgA PUSCH occasions by a time offset using all the MsgA RACH occasions in the configuration periodicity of the MsgA RACH occasions. The MsgA PUSCH occasion determined by the indicated MsgA RACH occasion may be repeated for each configuration periodicity of the MsgA PUSCH occasions.

(Proposal 6-2-1)

Figure 15:
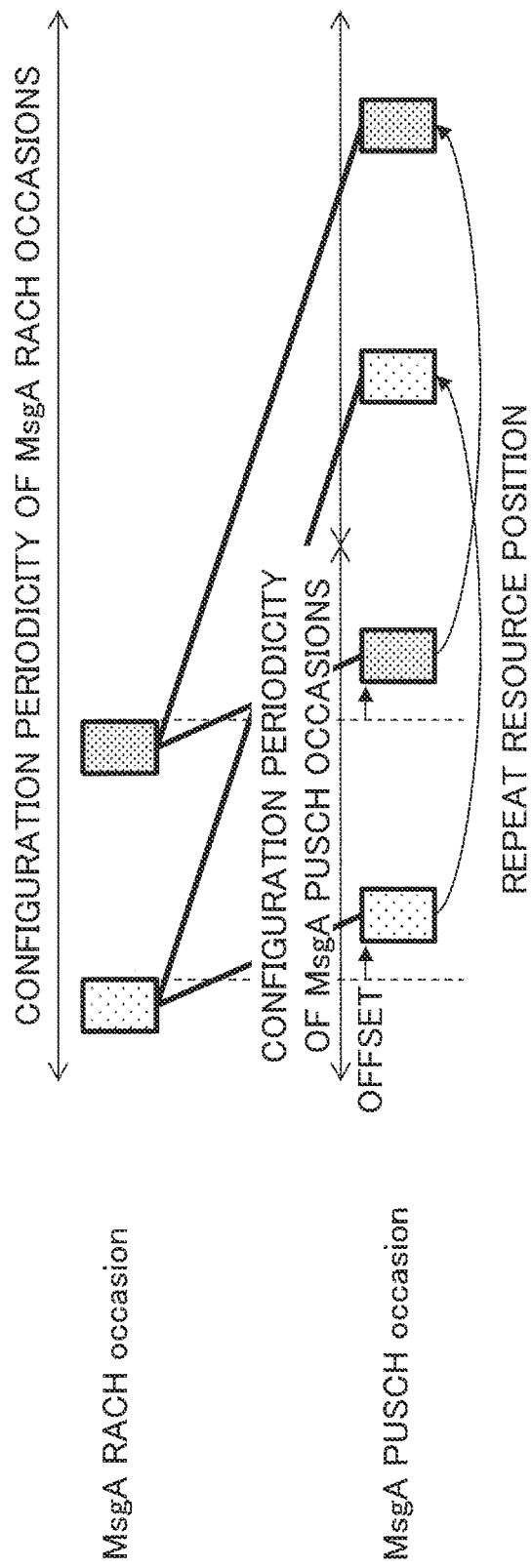
FIG. 15 is a diagram illustrating an example of Proposal 6-2-1.

FIG. 15 is a diagram illustrating an example of Proposal 6-2-1. For example, a MsgA RACH occasion and a MsgA PUSCH occasion having a time offset relation may be used as the mapping relation in the MsgA transmission by the terminal 10, and the mapping between the same MsgA RACH occasions and the repeated MsgA RACH occasions may be performed.

(Proposal 6-2-2)

Figure 16:
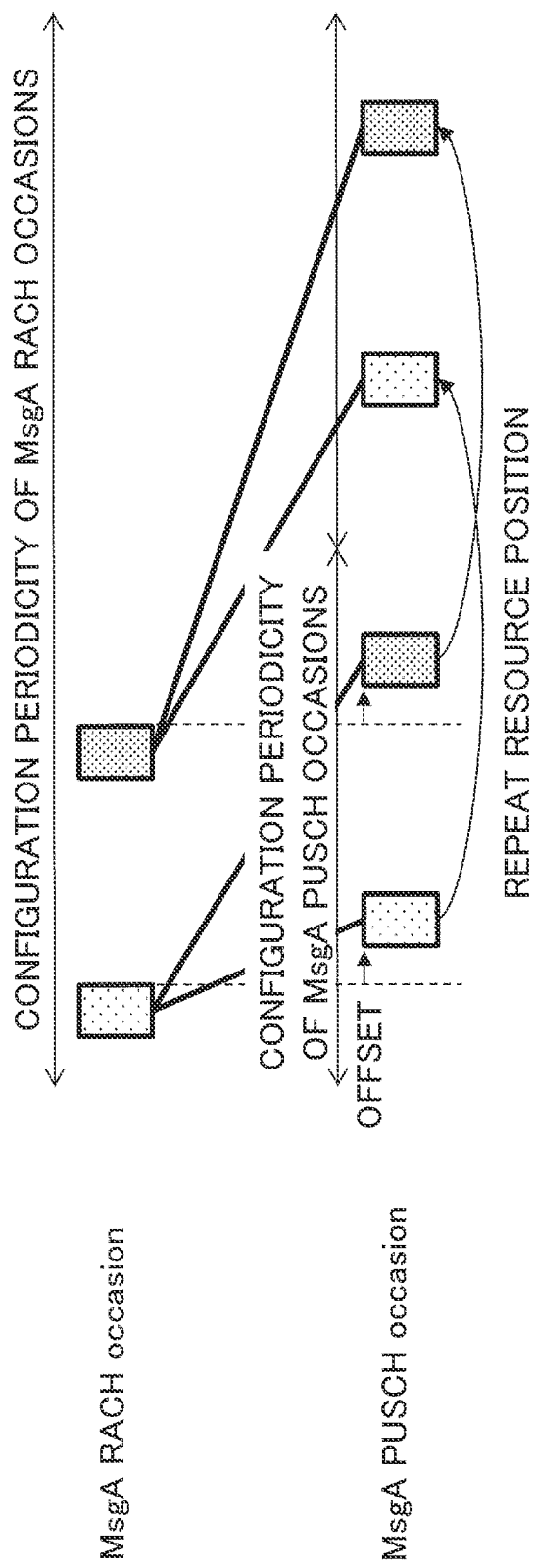
FIG. 16 is a diagram illustrating an example of Proposal 6-2-2.

FIG. 16 is a diagram illustrating an example of Proposal 6-2-2. The offset relation between the MsgA RACH occasion and the PUSCH occasion may be independent of the mapping relation in the MsgA transmission. For example, the mapping relation in the MsgA transmission may be indicated by a network.

(Proposal 6-3)

The base station 20 may indicate the time resource position of the MsgA PUSCH occasions independently of the MsgA RACH occasions. For example, the mapping relation may be indicated by the network.

(Proposal 6-3-1)

For example, as for the mapping relation between the MsgA RACH occasion and the MsgA PUSCH occasion in the MsgA transmission, mapping may be repeated between the same MsgA RACH occasion and the repeated MsgA PUSCH occasion.

(Proposal 6-3-2)

For example, as for the mapping relation between the MsgA RACH occasion and the MsgA PUSCH occasion in the MsgA transmission, mapping from a different MsgA RACH occasion onto the repeated MsgA PUSCH occasion may be performed (Device Configurations)

Next, examples of functional configurations of the terminal 10 and the base station 20 for executing the above-described processing and operation are described. The terminal 10 and the base station 20 include all the functions for executing the above-described embodiments. However, each of terminal 10 and the base station 20 may be provided with only some functions described in the embodiments. Note that the terminal 10 and the base station 20 may be collectively referred to as a communication apparatus.

<Terminal>

Figure 17:
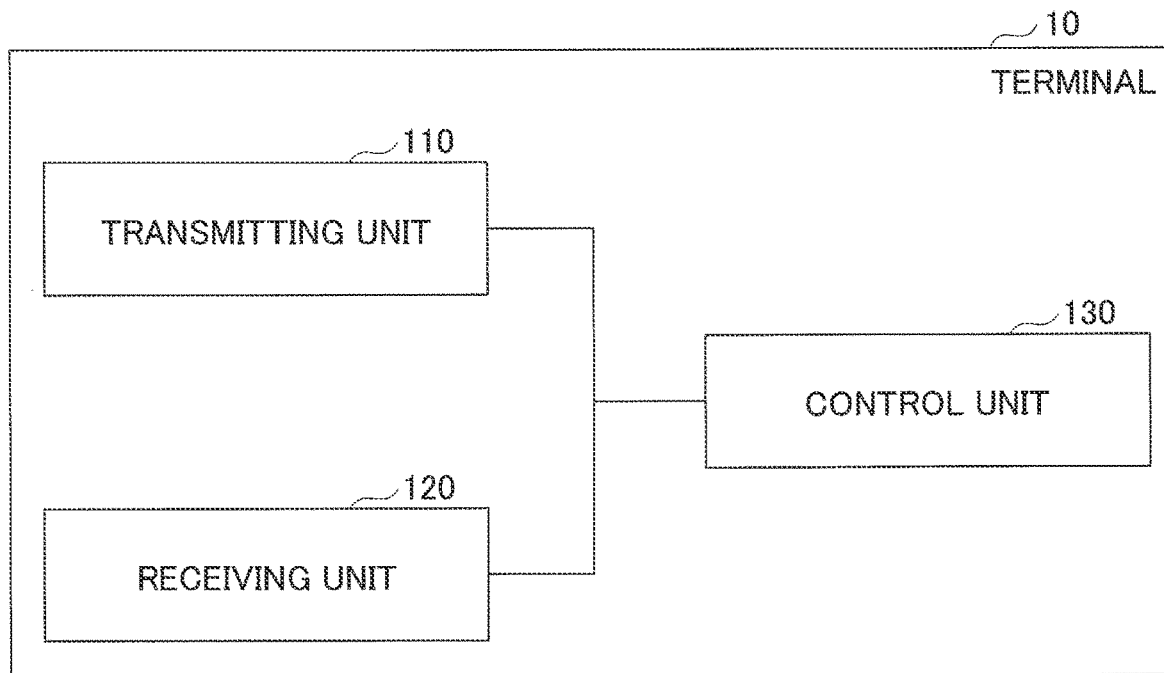
FIG. 17 is a diagram illustrating an example of a functional configuration of user equipment.

FIG. 17 is a diagram illustrating an example of a functional configuration of the terminal 10. As illustrated in FIG. 17, the terminal 10 includes a transmitting unit 110, a receiving unit 120, and a control unit 130. The functional configuration illustrated in FIG. 17 is an example. A functional division and the names of the functional units may be any division and the names provided that the operation according to the embodiments can be executed. The transmitting unit 110 may be referred to as a transmitter, and the receiving unit 120 may be referred to as a receiver.

The transmitting unit 110 creates transmission from transmission data, and wirelessly transmits the transmission signal. The transmitting unit 110 can form one or a plurality of beams. The receiving unit 120 wirelessly receives various signals, and obtains a higher layer signal from the received physical layer signal. Furthermore, the receiving unit 120 includes a measurement unit that obtains received power or the like by performing a measurement of a received signal.

The control unit 130 controls the terminal 10. Note that, a function of the control unit 130 related to transmission may be included in the transmitting unit 110, and a function of the control unit 130 related to reception may be included in the receiving unit 120.

For example, in the 4-step RACH procedure, the transmitting unit 110 transmits a random access preamble. The receiving unit 120 receives a random access response from the base station 20. The control unit 130 obtains information of a radio resource for transmitting the Message 3 from the random access response. The transmitting unit 110 transmits the Message 3 to the base station 20 through the radio resource configured by the control unit 130. The receiving unit 120 receives the Message 4 from the base station 20.

In addition, for example, in the 2-step RACH procedure, the transmitting unit 110 transmits a Message A. That is, the transmitting unit 110 transmits, to the base station 20, a random access preamble in the 2-step RACH procedure, and performs transmission of data on PUSCH in the 2-step RACH procedure before receiving a message corresponding to the Message 2 in the 4-step RACH procedure. The receiving unit 120 receives a Message B.

In the 2 step RACH procedure, the control unit 130 may determine the correspondence between the MsgA RACH occasion and the MsgA PUSCH occasion in accordance with any method of the above-described proposed methods when the transmitting unit 110 transmits the MessageA.

<Base Station 20>

Figure 18:
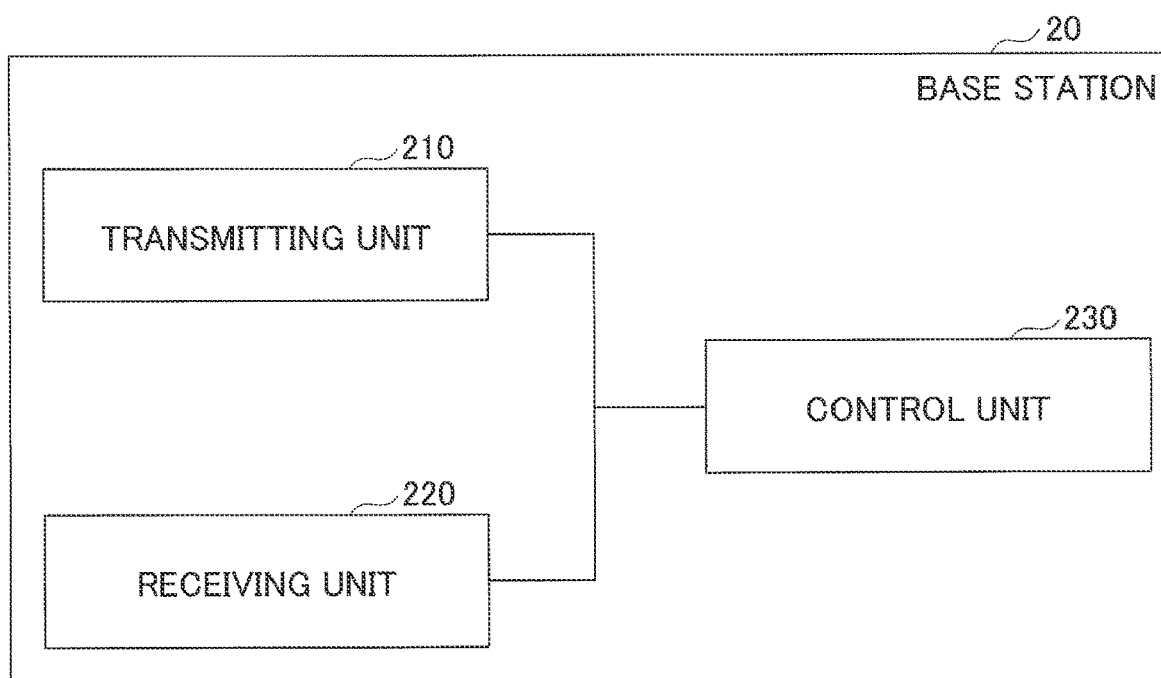
FIG. 18 is a diagram illustrating an example of a functional configuration of a base station.
Figure 19:
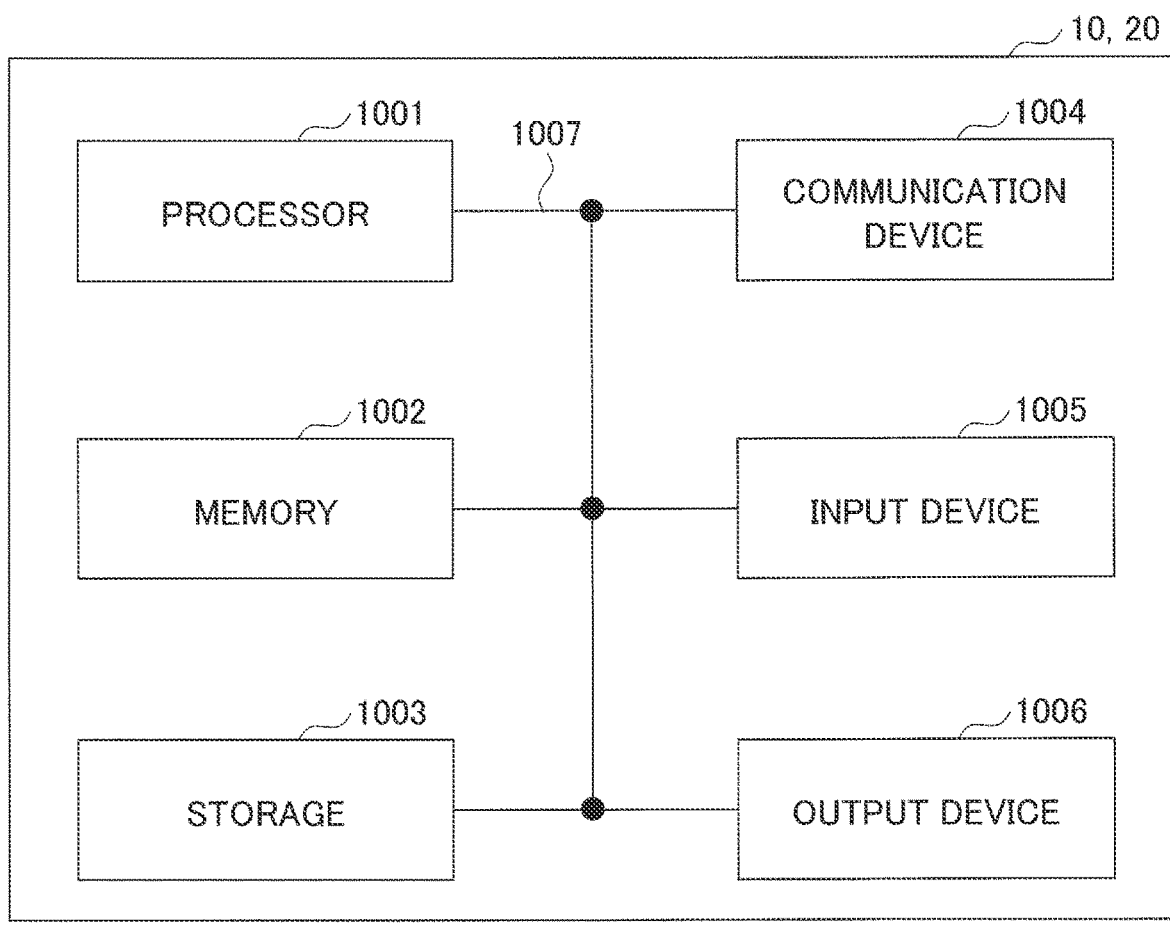
FIG. 19 is a diagram illustrating an example of a hardware configuration of user equipment and a base station.

FIG. 18 is a diagram illustrating an example of a functional configuration of the base station 20. As illustrated in FIG. 18, the base station 20 includes a transmitting unit 210, a receiving unit 220, and a control unit 230. A functional configuration illustrated in FIG. 18 is an example. A functional division and names of the functional units may be any division and names provided that the operation according to the embodiments can be executed. Note that, the transmitting unit 210 may be referred to as a transmitter, and the receiving unit 220 may be referred to as a receiver.

The transmitting unit 210 includes a function of generating a signal to be transmitted to the terminal 10, and wirelessly transmitting, the signal. The receiving, unit 220 includes a function of receiving various signals transmitted from the terminal 10, and obtaining, for example, information of a higher layer from the received signals. Furthermore, the receiving unit 220 includes a measurement unit that obtains received power or the like by measuring a signal received by the receiving unit 220.

The control unit 230 controls the base station 20. Note that, a function of the control unit 230 related to transmission may be included in the transmitting unit 210, and a function of the control unit 230 related to reception may be included in the receiving unit 220.

For example, in the 4-step RACH procedure, the receiving unit 220 receives a random access preamble transmitted from the terminal 10. The transmitting unit 210 transmits a random access response to the terminal 10. The control unit 230 includes, in the random access response, information indicating a radio resource for transmitting the Message 3 by the terminal 10. The receiving unit 220 receives the Message 3 from the terminal 10 through the radio resource configured by the control unit 230. The transmitting unit 210 transmits the Message 4 to the terminal 10.

In addition, for example, in the 2-step RACH procedure, the receiving unit 220 receives the MessageA transmitted from the terminal 10. That is, the receiving unit 220 receives the random access preamble in the 2-step RACH procedure from the terminal 10, and the receiving unit 220 receives data on PUSCH in the 2-step RACH procedure before transmitting a message corresponding to the Message 2 in the 4-step RACH procedure. The transmitting unit 210 performs transmission of the Message B.

Furthermore, in the 2-step RACH procedure, the control unit 230 may determine, for example, the correspondence between the MsgA RACH occasion and the MsgA PUSCH occasion based on a method according to any one of the above-described proposed method.

(Hardware Configuration)

In the block diagrams (FIG. 17 and FIG. 18) used for the description of the embodiments, the blocks of the functional units are illustrated. The functional blocks (configuring units) are implemented by any combination of hardware and/or software. A device of implementing each functional block is not particularly limited. In other words, each functional block may be implemented by one device in which a plurality of elements is physically and/or logically combined or may be implemented by a plurality of devices, that is, two or more devices which are physically and/or logically separated and are directly and/or indirectly connected (for example, a wired and/or wireless manner).

Furthermore, for example, both the terminal 10 and the base station 20 in one embodiment of the present invention may function as a computer that performs the process according to the embodiments. FIG. 8 is a diagram illustrating an example of a hardware configuration of each of the terminal 10 and the base station 20 according to the embodiments. Each of the terminal 10 and the base station 20 may be physically configured as a computer device including a processor 1001, a memory 1002, a storage 1003, a communication device 1004, an input device 1005, an output device 1006, a bus 1007, and the like.

In the following description, the term "device" may be replaced with a circuit, device, unit, or the like. The hardware configuration of each of the terminal 10 and the base station 20 may be configured to include one or more devices indicated by 1001 to 1006 illustrated in the figure or may be configured without including some devices.

Each function in each of the terminal 10 and the base station. 20 is implemented such that predetermined software (program) is read on hardware such as the processor 1001 and the memory 1002, and the processor 1001 performs an operation and controls communication by the communication device 1004 and reading and/or writing of data in the memory 1002 and the storage 1003.

For example, the processor 1001 operates an operating system and controls the entire computer. The processor 1001 may be configured with a central processing unit (CPU: Central Processing Unit) including an interface with a peripheral device, a control device, an operation device, a register, and the like.

Furthermore, the processor 1001 reads a program (program code), a software module, or data from the storage 1003 and/or the communication device 1004 out to the memory 1002, and executes various types of processes according to them. A program causing a computer to execute at least some of the operations described in the embodiments is used as the program. For example, the transmitting unit 110, the receiving unit 120, and the control unit 130 of the terminal 10 illustrated in FIG. 17 may be implemented by a control program which is stored in the memory 1002 and operates on the processor 1001. The transmitting unit 210, the receiving unit 220, and the control unit 230 of the base station 20 illustrated in FIG. 18 may be implemented by a control program which is stored in the memory 1002 and operates on the processor 1001. Various types of processes are described to be performed by one processor 1001 but may be performed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), and the like. The memory 1002 is also referred to as a "register," a "cache," a "main memory," or the like. The memory 1002 can store programs (program codes), software modules, or the like which are executable for carrying out the radio communication method according to an embodiment of the present invention.

The storage 1003 is a computer-readable recording medium and may be configured with, for example, at least one of an optical disk, such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 is also referred to as an "auxiliary storage device." The storage medium may be, for example, a database, a server, or any other appropriate medium including the memory 1002 and/or the storage 1003.

The communication device 1004 is hardware (a transmitting and receiving device) for performing communication between computers via a wired and/or wireless network and is also referred to as a "network device," a "network controller," a "network card," a "communication module," or the like. For example, the transmitting unit 110 and the receiving unit 120 of the terminal 10 may be implemented by the communication device 1004. Furthermore, the transmitting unit 210 and the receiving unit 220 of the base station 20 may be implemented by the communication device 1004.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The devices such as the processor 1001 and the memory 1002 are connected via the bus 1007 to communicate information with each other. The bus 1007 may be configured with a single bus or may be configured with different buses between the devices.

Furthermore, each of the terminal 10 and the base station 20 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these pieces of hardware.

(Conclusion of the Embodiments)

In this specification, at least the following terminal and the following communication method are disclosed.

A terminal including a receiving unit that receives information indicating mapping relation between transmission occasions for a random access preamble and transmission occasions for a physical uplink shared channel for a MessageA transmission in a two step random access procedure; and a control unit that selects, based on the mapping relation, a transmission occasion for the physical uplink shared channel for the MessageA transmission in the two step random access procedure.

According to the above-described configuration, there is provided a method of indicating a time resource of a MsgA PUSCH occasion when configuration periodicity of MsgA PUSCH occasions differs from configuration periodicity of MsgA RACH occasions.

The mapping relation may be such that the mapping relation between the transmission occasions for the random access preamble and the transmission occasions for the physical uplink shared channel is repeated in units of configuration periodicity of the transmission occasions for the random access preamble.

According to the above-described configuration, there is provided a method of indicating a time resource of a MsgA PUSCH occasion when configuration periodicity of MsgA PUSCH occasions differs from configuration periodicity of MsgA RACH occasions.

The configuration periodicity of the transmission occasions for the physical uplink shared channel may be greater than configuration periodicity of the transmission occasions for the random access preamble, and the mapping relation may indicate a time offset between a transmission occasion for the physical uplink shared channel within the configuration periodicity of the transmission occasions for the physical uplink shared channel and a transmission occasion for the random access preamble.

According to the above-described configuration, a terminal can determine a time resource of a MsgA PUSCH occasion based on an offset.

Configuration periodicity of the transmission occasions for the physical unlink shared channel may be greater than configuration periodicity of the transmission occasions for the random access preamble, and the mapping relation may be such that a transmission occasion for the random access preamble in configuration periodicity of the transmission occasions for the random access preamble, the transmission occasion for the random access preamble being used as a start of a time offset for a resource position of the transmission occasion for the physical uplink shared channel, is associated with the corresponding transmission occasion for the physical uplink shared channel, and a transmission occasion for the random access preamble within another configuration periodicity of the transmission occasions for the random access preamble is not associated with a transmission occasion for the physical uplink shared channel.

According to the above-described configuration, for example, when a selected transmission occasion for a random access preamble is not associated with a transmission occasion for a physical uplink shared channel, the terminal can select to perform the 4-step RACH.

Configuration periodicity of the transmission occasions for the physical uplink shared channel may be less than configuration periodicity of the transmission occasions for the random access preamble, and the mapping relation may indicate a time resource position of a transmission occasion for the physical uplink shared channel by using a time offset, while using only a portion of the transmission occasions for the random access preamble in the configuration periodicity of the transmission occasions for the random access preamble. According to the above-described configuration, the terminal can determine a time resource of the MsgA PUSCH occasion based on the offset.

A communication method executed by a terminal, the method including receiving information indicating mapping relation between transmission occasions for a random access preamble and transmission occasions for a physical uplink shared channel for a MessageA transmission in a two step random access procedure; and selecting, based on the mapping relation, a transmission occasion for the physical uplink shared channel for the MessageA transmission in the two step random access procedure. According to the above-described configuration, there is provided a method of signaling a time resource of a MsgA PUSCH occasion when configuration periodicity of MsgA PUSCH occasions differs from configuration periodicity of MsgA RACH occasions.

(Supplement of Embodiment)

The embodiments of the present invention are described above, but the disclosed invention is not limited to the above-described embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention. Matters described in two or more items may be combined and used as necessary, and a matter described in one item may be applied to a matter described in another item (as long as there is no contradiction). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the terminal 10 and the base station 20 are described using the functional block diagrams, but such devices may be implemented by hardware, software, or a combination thereof. Software executed by the processor included in the terminal 10 according to the embodiment of the present invention and software executed by the processor included in the base station 20 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

A notification of information is not limited to the aspect or embodiment described in this specification and may be given by any other method. For example, the notification of information may be given physical layer signaling (for example, downlink control information (DCI), uplink control information (UCI)), higher layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an "RRC message" and may be, for example, an RRC connection setup message, an RRC connection reconfiguration message, or the like.

Each aspect and embodiment described in this specification is applicable to Long Term Evolution (LTE), LTE-Advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), and systems using any other appropriate systems and/or next generation systems expanded on the basis of the systems.

The processing procedures, the sequences, the flowcharts, and the like of the respective aspects/embodiments described in this specification may be modified in order as long as there is no contradiction. For example, the method described in this specification presents elements of various steps in an exemplary order and is not limited to a presented specific order.

In this specification, a specific action that is supposed to be performed by the base station 20 may be performed by an upper node in some cases. In the network including one or more network nodes including the base station 20, various operations performed for communication with the terminal 10 can be obviously performed by the base station 20 and/or any network node (for example, an MME, an S-GW, or the like is considered, but it is not limited thereto) other than the base station 20. The example in which the number of network nodes excluding the base station 20 is one has been described above, but a combination of a plurality of other network nodes (for example, an MME and an S-GW) may be provided.

Each aspect/embodiment described in this specification may be used alone, may be used in combination, or may be switched in association with execution.

The terminal 10 is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms, depending on those having skill in the art.

The base station 20 may also be referred to as a Node B (NB), an enhanced Node B (eNB), a base station, a gNB, or other appropriate terms, by those having skill in the art.

The terms "determine (determining)" and "decide (determining)" used in this specification may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

A phrase "on the basis of" used in this specification is not limited to "on the basis of only" unless otherwise stated. In other words, a phrase "on the basis of" means both "on the basis of only" and "on the basis of at least."

"Include," "including," and variations thereof are intended to be comprehensive, similar to a term "provided with (comprising)" as long as the terms are used in this specification or claims set forth below. Furthermore, the term "or" used in this specification or claims set forth below is intended not to be an exclusive OR.

In the present disclosure, for example, when an article such as "a," "an," or "the" in English is added by a translation, such an article is assumed to include the plural unless it is obviously indicated that such an article does not include the plural.

Although the present invention has been described above in detail, it is obvious to those having skill in the art that the present invention is not limited to the embodiments described in this specification. The present invention can be carried out as revisions and modifications without departing from the gist and scope of the present invention defined by the claims set forth below. Accordingly, the description of this specification is intended to be exemplary and does not have any restrictive meaning to the present invention.

LIST OF REFERENCE SYMBOLS 10 terminal
110 transmitting unit
120 receiving unit
130 control unit
20 base station
210 transmitting unit
220 receiving unit
230 control unit
1001 processor
1002 memory
1003 storage
1004 communication device
1005 input device
1006 output device

The invention claimed is:

1. A terminal comprising:
a receiver that receives information indicating mapping relation between transmission occasions for a random access preamble and transmission occasions for a physical uplink shared channel for a MessageA transmission in a two step random access procedure; and
a processor that selects, based on the mapping relation, a transmission occasion for the physical uplink shared channel for the MessageA transmission in the two step random access procedure,
wherein configuration periodicity of the transmission occasions for the physical uplink shared channel is greater than configuration periodicity of the transmission occasions for the random access preamble, and
wherein the mapping relation is such that a transmission occasion for the random access preamble in configuration periodicity of the transmission occasions for the random access preamble, the transmission occasion for the random access preamble being used as a start of a time offset for a resource position of the transmission occasion for the physical uplink shared channel, is associated with the corresponding transmission occasion for the physical uplink shared channel, and a transmission occasion for the random access preamble within another configuration periodicity of the transmission occasions for the random access preamble is not associated with a transmission occasion for the physical uplink shared channel.

2. The terminal according to claim 1, wherein the mapping relation is such that mapping relation between the transmission occasions for the random access preamble and the transmission occasions for the physical uplink shared channel is repeated in units of configuration periodicity of the transmission occasions for the random access preamble.

3. The terminal according to claim 1, wherein configuration periodicity of the transmission occasions for the physical uplink shared channel is less than configuration periodicity of the transmission occasions for the random access preamble, and wherein the mapping relation indicates a time resource position of a transmission occasion for the physical uplink shared channel by using a time offset, while using only a portion of the transmission occasions for the random access preamble in the configuration periodicity of the transmission occasions for the random access preamble.

4. A communication method executed by a terminal, the method comprising:

receiving information indicating mapping relation between transmission occasions for a random access preamble and transmission occasions for a physical uplink shared channel for a MessageA transmission in a two step random access procedure; and selecting, based on the mapping relation, a transmission occasion for the physical uplink shared channel for the MessageA transmission in the two step random access procedure, wherein configuration periodicity of the transmission occasions for the physical uplink shared channel is greater than configuration periodicity of the transmission occasions for the random access preamble, and wherein the mapping relation is such that a transmission occasion for the random access preamble in configuration periodicity of the transmission occasions for the random access preamble, the transmission occasion for the random access preamble being used as a start of a time offset for a resource position of the transmission occasion for the physical uplink shared channel, is associated with the corresponding transmission occasion for the physical uplink shared channel, and a transmission occasion for the random access preamble within another configuration periodicity of the transmission occasions for the random access preamble is not associated with a transmission occasion for the physical uplink shared channel.

* * * * *